Oct. 2, 1923.

C. F. CUNNINGHAM

CAP FOR TIRE VALVE TUBES

Filed March 15, 1922

1,469,250

Inventor:
Cornelius F. Cunningham
By his attorney
Charles L. Goodwin

Patented Oct. 2, 1923.

1,469,250

UNITED STATES PATENT OFFICE.

CORNELIUS F. CUNNINGHAM, OF CANTON, MASSACHUSETTS.

CAP FOR TIRE-VALVE TUBES.

Application filed March 15, 1922. Serial No. 543,832.

*To all whom it may concern:*

Be it known that I, CORNELIUS F. CUNNINGHAM, a citizen of the United States, residing at Canton, in the county of Norfolk and State of Massachusetts, have invented new and useful Improvements in Caps for Tire-Valve Tubes, of which the following is a specification.

This invention relates to improvements in caps for tire valve tubes, and has for its object to provide a cap of the class described which may be screwed against the outer extremity of a valve tube for the purpose of tightly closing the opening through the latter and preventing a leakage of air therefrom, said cap being so constructed that it is impossible for the washer provided for said cap to become accidentally detached therefrom and lost when said cap is removed from said tube, while at the same time providing a construction which enables said washer to be easily and quickly removed from said cap if it is desired to replace said washer when the latter becomes worn.

The invention consists in the combination and arrangement of parts set forth in the following specification and particularly pointed out in the claim thereof.

Referring to the drawings.

Like numerals refer to like parts throughout the several views of the drawings.

Figure 1:
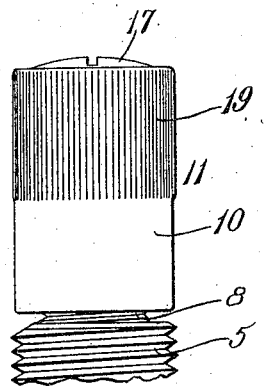
Figure 1 represents a side elevation of a portion of a tire valve tube having a cap embodying my invention attached thereto.
Figure 2:
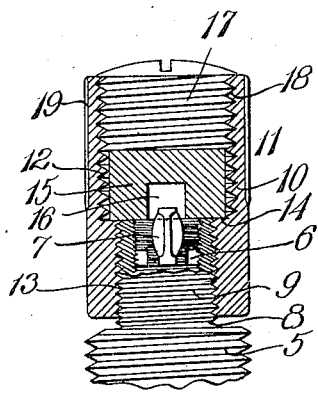
Fig. 2 represents a central longitudinal section through the cap and a portion of the tire valve tube, certain portions of the device being illustrated in elevation.

In the drawings, referring particularly to Figs. 1 and 2, 5 represents a portion of a tire valve tube of well known construction, the same being attached to a vehicle tire in a manner well known to those skilled in the art and having a valve 6 of well known construction and provided with a valve stem 7 located therein. An end portion 8 of the tube 5 is screw-threaded at 9 to receive a body portion 10 of a cap 11. The body portion 10 has a passage 12 extending therethrough, the lower portion of which is screw-threaded at 13 to fit the thread 9 of the tube 5. The upper portion of the passage 12 is of greater diameter than the lower portion thereof thereby forming a shoulder 14 at a point intermediate the length of said passage against which a washer 15 located within said passage is seated. The washer 15 is formed of any suitable material and is provided with a recess 16 in the under surface thereof into which the upper end of the valve stem 7 may project. The washer 15 is held securely within the passage 12 and against the shoulder 14 by a screw 17 which engages corresponding screw threads 18 provided within the upper portion of the passage 12, the lower extremity of said screw engaging the upper extremity of said washer as illustrated in Fig. 2. A portion of the periphery of the body portion 10 of the cap 11 is knurled at 19 to provide a suitable gripping surface thereon.

When clamped in position against the shoulder 14, it is impossible for the washer 15 to drop out of the passage 12 when the cap 11 is removed from the valve 5 as, for example, when it is desired to pump up the tire, yet when, for any reason, it is desired to remove said washer from said cap, as for example, to replace the same with a new washer, the same may be easily accomplished by simply removing the screw 17 and removing said washer from said passage.

Figure 3:
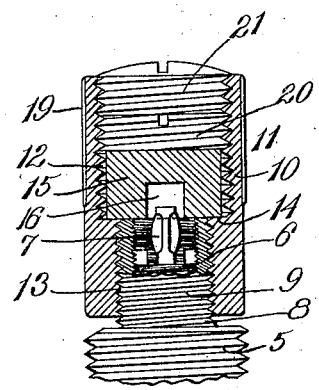
Fig. 3 is a view similar to Fig. 2 but illustrating a modified embodiment of the invention.

In Fig. 3 I have illustrated a modified embodiment of my invention in which the washer 15 is held in place by screws 20 and 21, the former contacting with the upper extremity of said washer and the latter contacting with the upper extremity of the screw 20 and constituting a lock screw therefor. In other respects, the device of Fig. 3 is exactly like the device of Figs. 1 and 2.

I claim:

A cap for a tire valve tube having, in combination, a body portion provided with a passage extending therethrough, one end portion of said passage being of greater diameter than the other end portion thereof, thereby forming a shoulder intermediate the length thereof, a washer located within said passage, a screw engaging the wall of said passage and contacting with said washer and positively forcing said washer against said shoulder and a second screw also having engagement with the wall of said passage and contacting with said first-named screw.

In testimony whereof I have hereunto set my hand in presence of two subscribing witnesses.

CORNELIUS F. CUNNINGHAM.

Witnesses:
FRANKLIN E. LOW,
HAZEL F. LA MUDGE.